United States Patent [19]

Perkins

[11] 4,007,844
[45] Feb. 15, 1977

[54] SELF FOLDING PLATFORM

[75] Inventor: William V. Perkins, Monrovia, Calif.

[73] Assignee: Maxon Industries, Inc., Huntington Park, Calif.

[22] Filed: Feb. 2, 1976

[21] Appl. No.: 654,334

[52] U.S. Cl. .............................. 214/75 T; 187/9 R
[51] Int. Cl.² ......................................... B60P 1/44
[58] Field of Search ............. 214/75 T, 77 P, 75 R; 187/9 R

[56] References Cited

UNITED STATES PATENTS

| 3,275,170 | 9/1966 | MacRae | 214/75 T |
| 3,791,541 | 2/1974 | Himes | 214/75 T |
| 3,795,329 | 3/1974 | Martin | 214/75 T |
| 3,800,915 | 4/1974 | Himes | 214/75 T |
| 3,831,788 | 8/1974 | Erlinder | 187/9 R |
| 3,968,890 | 7/1976 | Robson | 214/75 T |

FOREIGN PATENTS OR APPLICATIONS 1,313,514  4/1973  United Kingdom .............. 214/75 T Primary Examiner—Richard J. Johnson
Attorney, Agent, or Firm—Frederick E. Mueller

[57] ABSTRACT

A load lifting and lowering platform comprises a pair of hingedly interconnected platform sections that are foldable between a horizontally extending, load bearing position and a vertically extending collapsed position. A forward one of the platform sections is hingedly connected at its forward edge to lower ends of a pair of runner assemblies that are vertically movably mounted in a supporting framework. A pair of chains are interconnected between upper ends of the pair of runner assemblies and outer ends of the outer one of the platform sections. Cooperating cam elements, interposed between the forward edge of the forward platform section and the supporting framework, translate vertical movement of the runner assemblies into angular movement of the platform sections, in cooperation with the chains, for folding and unfolding of the platform sections.

21 Claims, 13 Drawing Figures

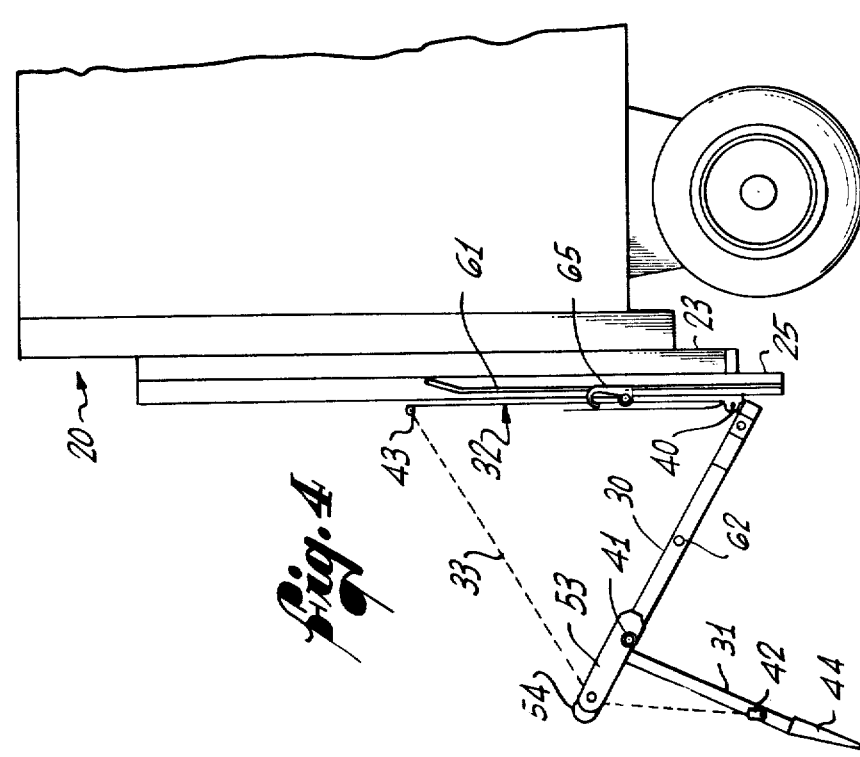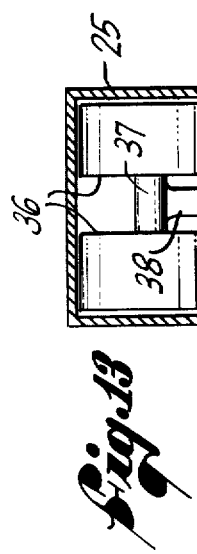

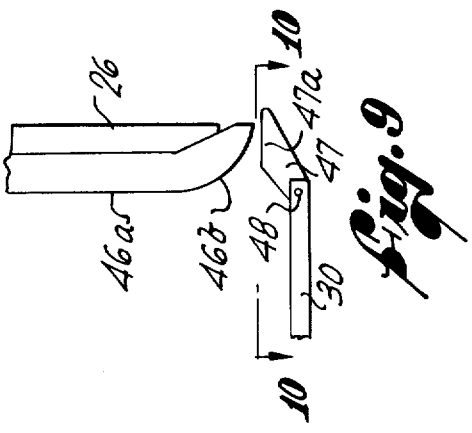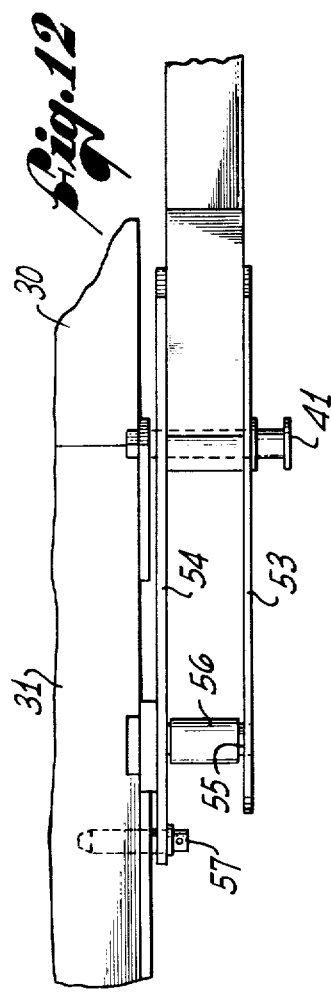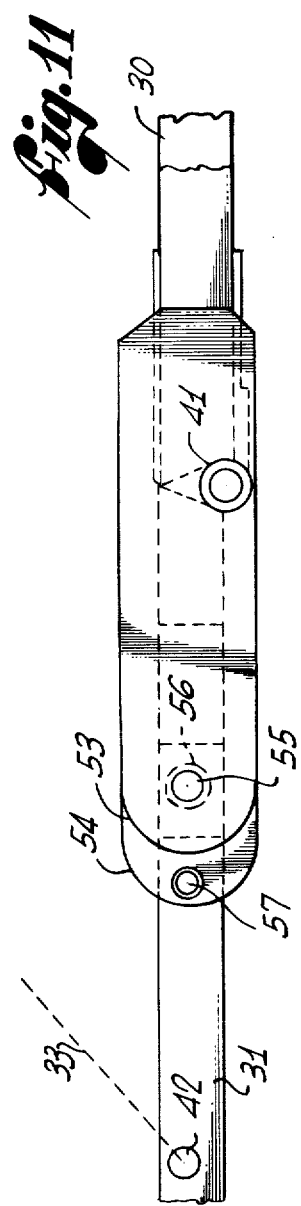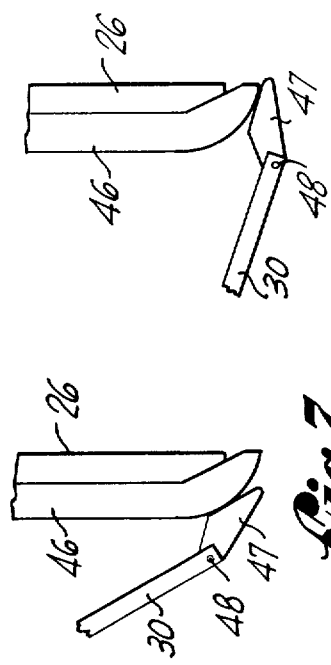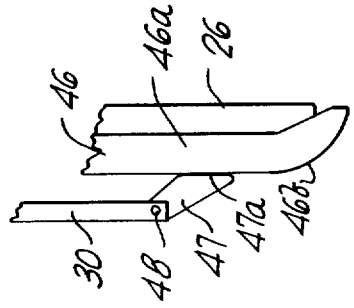

SELF FOLDING PLATFORM

BACKGROUND

This invention relates to load elevators of the collapsible type, a common example of which is a truck tailgate lift.

For some types of freight a load lifting and lowering platform of large area, e.g., 6 × 6 feet, is required by trucks for tailgate mounting. For such use there is a species of lift whose supporting framework includes a pair of laterally spaced apart channels framing the sides of the truck's tailgate opening to vertically movably mount a pair of lifting legs on or in the guide channels. The lifting legs pivotally carry a forward platform section that, in turn, hingedly carries an outer platform section. Erlinder U.S. Pat. No. 3,831,788 discloses a lift of this type which is only partially self-folding in response to actuation of the power means for the lift, in that it employs two pairs of chains, one set of which must be detached in an intermediate step of folding or unfolding the lift. Martin U.S. Pat. No. 3,795,329 discloses another lift of this class which is manually movable for folding and unfolding, which is a very great disadvantage considering the weight of the platform sections. The prior art devices are comparatively complex and have several other operational disadvantages.

SUMMARY OF THE INVENTION

In this invention, a supporting framework includes a laterally spaced apart vertically disposed pair of guide channels vertically movably mounting a vertically elongate pair of runner assemblies. At their lower ends the pair of runner assemblies pivotally mount the forward edge of a forward platform section whose rear edge is hingedly interconnected to the forward edge of a rear or outer platform section. A pair of chains are mounted on opposite sides of the assembly, each extending between a point of connection to the upper end of one of the runner assemblies and a point of connection at the rear end of the rear platform section on the corresponding side. At both sides, the forward platform section is provided with rigid rearward extensions in vertical alignment with the chain of the corresponding side. Cooperating cam elements intermediate the forward edge of the forward platform section and the lower end of the guide channel or channels translate powered vertical movement of the runner assemblies into corresponding folding or unfolding movement of the forward platform section to, in turn, effect sequential corresponding folding or unfolding movement of the outer platform section. Apart from the fact that one of the cam elements is manually movable into and out of interfering alignment with the other of the cam elements, the operation is entirely automatic. Contrasted to the prior art, but a single pair of chains is employed, the chains having the dual function of not only supporting the unfolded platform in cantilevered, horizontally extending, load bearing position but, also, functioning as operative elements in the folding and unfolding operations.

DESCRIPTION OF THE DRAWINGS

FIGS. 2–5 inclusive are schematic side elevational views illustrating different relative positions of platform components of the invention in their sequence of movement between folded and unfolded configurations.

FIGS. 6–9 inclusive are schematic partial side elevational views of cam components of the lift in different relative positions in their sequence of movement between the folded and unfolded configurations of the platform.

FIG. 10 is a partial plan view on the line 10—10 of FIG. 9, on a larger scale, of one of the cam elements of FIGS. 6–9.

FIG. 11 is a partial side elevational view, on a larger scale, of the hinge connection between the inner and outer platform sections.

FIG. 12 is a partial top plan view of the mechanism shown in FIG. 13.

FIG. 13 is a horizontal sectional view, on a larger scale, of one of the lifting column assemblies taken on the line 13—13 of FIG. 1.

DESCRIPTION OF THE PREFERRED EMBODIMENT

Figure 1:
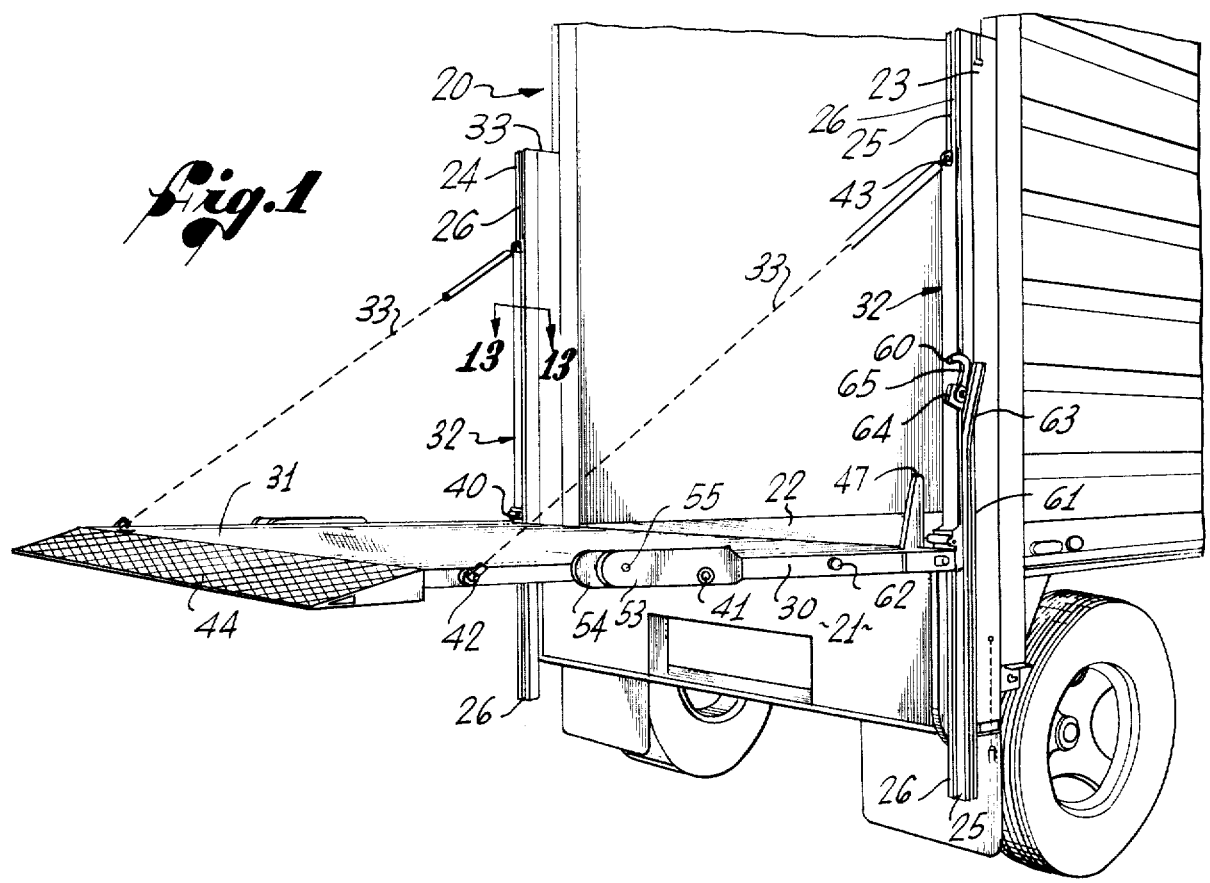
FIG. 1 is a perspective view of a self-folding tailgate lift platform of the present invention incorporated on the rear-end of a truck, illustrating the platform in horizontally extending, load bearing position.

Referring to FIG. 1, the invention is illustrated as affixed to the rear-end of a freight truck 20. In the illustrated case, the supporting framework for the load elevator includes a box-like cross frame 21 having its upper face flush with the floor 22 of the van body. At the opposite ends of the cross frame 21 are a pair of vertically extending frame members 23, which may comprise box beam members secured to or defining the tailgate opening of the van body. Rigidly secured to the rear face of frame members 23 are elongate, vertically extending lift guide channels 24 and 25, which may be of essentially C-shaped cross sectional configuration as shown in FIG. 13, the rear face of each guide member having rearwardly opening, full length, vertically extending slot 26. It will be noted that the lower ends of the pair of hollow guide members 24 and 25 terminate in a common horizontal plane spaced vertically downwardly beneath the horizontal plane of the floor 22 of the van body.

Briefly, the load elevator comprises an inner or forward platform section 30 and an outer or rear platform section 31, a pair of runner assemblies 32 vertically movable in the pair of guide channels 24 and 25 and to which the forward edge of the inner platform section 30 is hingedly connected, a pair of chains 33, and a selectively actuable means for translating vertical movement of the platform assembly into angular movement of the inner platform section to, in turn, effect folding or unfolding of the platform sections.

Referring to FIG. 13, each of the runner assemblies 32 includes a vertically elongate bar 35 mounted on the slotted rear face of the corresponding one of the guide members 24 or 25. Within the guide member the bar 35 carries a longitudinally spaced apart series of pairs of wheels 36 for vertically rolling engagement with the inner surface of the corresponding guide member. By way of example, each pair of wheels may be mounted on a common axle means 37 that, in turn, is carried on an inner end of a stud 38, or the like, which projects through the channel's slot 26 and is secured, as by welding, to the forward face of the runner bar 35.

While not illustrated, it will be understood that the pair of runner assemblies 32 are connected to a common source of power to effect raising and lowering of the pair of runner assemblies in unison. Such means could take the form of a pulley and cable system with a power source housed in the transverse box frame 21 and having the cables reeved through the pair of frame members 23 and hollow guide members 24 and 25 with the pair of cable ends secured to upper ends of the pair of runner assemblies 32. This and a variety of other platform power mechanisms are well known in the art.

At their lower ends, the pair of runner assemblies 32 carry coaxially aligned hinge means 40 interconnected to the forward edge of the inner or forward platform section 30. The latter platform section, in turn, has its rear edge interconnected by a hinge means 41 to the forward edge of the outer platform section 31. The pair of chains 33 are mounted at opposite sides of the platform assembly with one end connected, as at 42, adjacent the rear edge of the outer platform section 31 and the other end connected, as at 43, to a fitting at the upper end of the corresponding runner assembly 32. If desired, a loading ramp 44 may be secured to the rear edge of the outer platform section 31 as either a foldable or rigid extension of the outer platform section.

The articulation of the platform components is such that the inner platform section 30 is angularly movable, relative to the hinge means 40, between a rearwardly horizontally extending position and a vertically upwardly extending position. The outer platform section 31 is angularly movable, relative to its pivot axis 41 between a rearwardly horizontally extending position, as a rigid extension of the platform section 30, and a vertically downwardly extending position, in which the underside of the outer platform section closely overlies or abuts the underside of the inner platform section 30.

Turning of the forward platform section 30 between vertical and horizontal positions is accomplished by a cam means responsive to vertical movement of the pair of runner assemblies 32. A pair of similar cam means can be provided for each side of the platform assembly. However, in the illustrated case only the curbside guide member 25 is provided with a fixed cam member 46 mounted in vertical alignment with a cam follower element 47 carried by the forward platform section 30 on the corresponding curbside thereof. As is shown in FIG. 10, the cam follower 47 has one end connected to a shaft 48 that is journalled between a pair of frame members 49 and 50 of the forward platform section 30. The shaft 48 is fitted with a torsion spring 51 normally biasing the cam follower 47 to the protruding position thereof illustrated in FIG. 1. In FIG. 10, the cam follower 47 is illustrated as having been manually turned into a position in which it extends beyond the forward edge of the platform section 30, i.e., the position indicated in FIGS. 6–9. As is shown in FIG. 10, one side of the cam follower 47 has a stop member 52 secured thereto, as by welding, which upon coming into abutment with the upper surface of the platform frame member 49 defines the position of the cam follower illustrated in FIGS. 6–9.

The profiles of the cam member 46 and cam follower 47 are best seen in FIGS. 6–9. As shown, the cam 46 has a vertically extending straight edge 46a merging into lowermost curved cam section 46b, the cam follower 47 having a straight edge 47a that is slidable over the surfaces of the cam 46.

Figure 2:
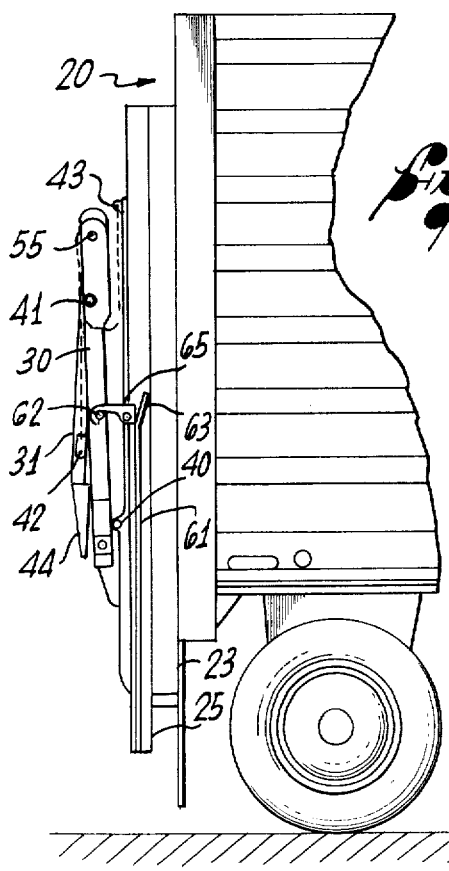

The relative positions of the cam elements 46 and 47 illustrated in FIG. 6 correspond to the fully folded condition of the platform sections 30 and 31, illustrated in FIG. 2, in which the underside of the outer platform section 31 overlies the underside of the forward platform section 30. It will be understood that in this position of the parts the platform assembly is gravitationally biased to unfold but is held in check against unfolding movement by the engagement of the cam follower straight edge 47a with the straight vertical edge 46a of the cam 46. Upon movement downwardly of the platform assembly and, therefore, of the cam follower 47, the cam follower comes into sliding engagement with the curved section 46b of the cam to gradually unfold the inner platform section 30 in a positively restrained manner, due to the check provided by the contact of the cam follower against the curved cam section 46b, until the platform section 30 attains the horizontal condition illustrated in FIG. 9. Subsequently, upon further lowering movement of the runner assemblies 32, the cam follower spring 51 turns the cam follower to the retracted, upwardly projecting position depicted in FIG. 1, in which the cam follower is out of interfering alignment with the cam 46.

Figure 3:
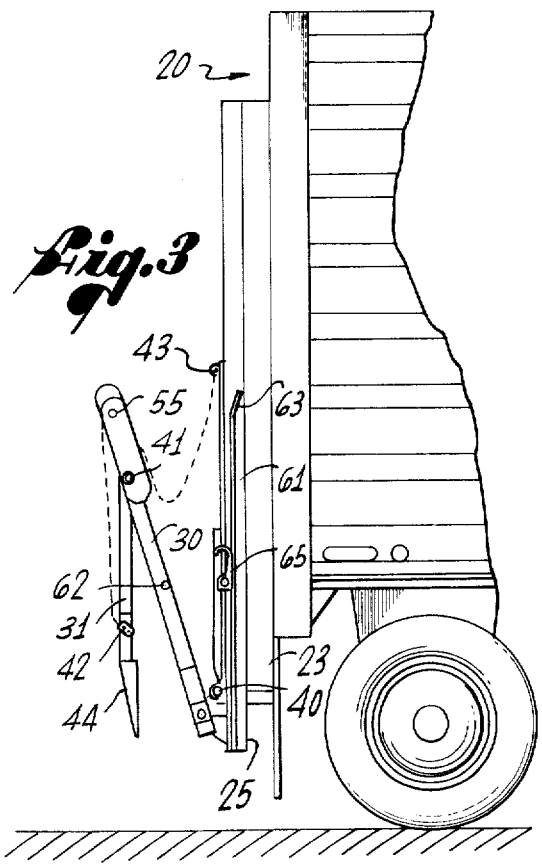

The relative positions of the cam elements 46 and 47 in FIG. 7 correspond, approximately, to the relative positions of the platform sections illustrated in FIG. 3. In this phase of movement the outer platform section 31 is freely gravitationally suspended about the pivot axis 41 between the two platform sections. However, as the angle included between the cam element 46 and the forward platform section 30 increases to that depicted in FIGS. 4 and 8, the slack in the pair of chains 33 is taken up in a manner to effect unfolding of the outer platform section 31.

More specifically, both sides of the forward platform section 30 are provided with rigid extensions projecting rearwardly, relative to the platform hinge 41, for engaging the pair of chains 33 in order to translate a portion of the unfolding or folding movement of the forward platform section into corresponding unfolding or folding movement of the rearward platform section 31. Referring to FIGS. 11 and 12, wherein the curbside bracket assembly is shown, a parallel, laterally spaced apart pair of bracket bars 53 and 54 are rigidly secured, as by welding, to the corresponding forward platform side frame members, comprising essentially linear rearward extensions thereof projecting rearwardly relative to the hinge axis 41. Adjacent the outermost ends of the pair of bracket bars 53 and 54 they are rigidly interconnected by a pin 55 over which a roller sleeve 56 is journalled.

As is best illustrated in FIG. 4, the spacing of the roller supporting pins 55 relative to the platform hinge interconnection 41 is such that the rollers 56 come into engagement with the corresponding chains 33 after an initial angular increment of opening movement by the forward platform section 30. Thereafter, upon the slack of the chain 33 being taken up, further unfolding movement of the forward platform section is translated into unfolding movement of the outer platform section 31. As the two platform sections approach the horizontal, fully unfolded position of FIG. 5, the rollers 56 move out of engagement with the chains 33 but further unfolding movement of both platform sections continues as a function of the straight, tensioned chains 33 and the cam elements 46 and 47 translation of further downward movement of the runner assemblies 32. As is shown in FIG. 11, the confronting edges of the platform sections 30 and 31 at the hinge line 41 define a butt joint upwardly offset relative to the hinge axis. Accordingly, when the platform sections are in the horizontal position they are suspended by the pair of chains 33 as essentially a single horizontally rigid platform cantilevered relative to the hinge 48. While not necessary, it will be observed from FIGS. 11 and 12 that the bracket arm 54 may be projected rearwardly beyond the rear end of the other bracket bar 53 to provide for the mounting of a removable safety pin 57 through aligned apertures of the bracket bar 54 and the confronting edge of the framework of the outer platform section 31.

In FIG. 2, the platform is shown in fully collapsed and raised position. As will now be apparent, the forward platform section 30 is so locked by the engagement of the cam follower 47 with the straight edge portion 46a of the cam, while the rearward or outer platform section 31 is so maintained by virtue of its gravitationally depending from the platform hinge 41. However, a latch means is provided to maintain the platform sections in the collapsed folded condition during lowering of the runner assemblies 32 in order to facilitate dock loading of the vehicle on which the apparatus is mounted.

Referring to FIGS. 1–3, such latch means may take the form of a manually operable hook 60, carried by one of the runner assemblies 32, and a cooperating hook locking bar 61 on the corresponding stationary guide channel. In the illustrated case, the bar 61 is an elongate vertically extending member, of sufficient length to cover the range of vertical movement of the hook 60, affixed to the curbside face of the curbside guide channel 25. A lock pin 62 is mounted on the curbside edge of the forward platform section 30 for selective engagement and disengagement by the hook 60, the latter being mounted intermediate the ends of the runner assembly 32. An upper end portion 63 of the hook lockbar inclines forwardly upwardly so that when the collapsed platform is in the fully raised position of FIG. 2 the hook 60 can be freely swung between the latching position of FIG. 2 and the unlatched position illustrated in FIG. 1, the inclined portion 63 providing clearance for this purpose.

When the hook 60 is in the latching position of FIG. 2, one edge 64 thereof is aligned with the vertically extending straight rear face of the hook locking bar 61 to be slidable thereover. Accordingly, if the hook 60 is allowed to remain latched the platform will remain securely locked in the collapsed position upon lowering of the runner assemblies 32, since unlatching pivotal movement of the hook is prevented throughout the vertical extent of the straight rear face of the locking bar 61. On the other hand, when it is desired to unfold the platform sections in response to lowering of the runner assemblies 32, the hook 60 can be moved to the open position (shown in FIG. 1) wherein another edge 65 of the hook comes into engagement with the clearance section 63 of the bar, the center of gravity of the hook going forwardly over-center of its pivot axis. As a result, upon downward movement of the runner assemblies relative to the supporting framework, the edge 65 of the hook 60 comes into sliding engagement with and is held against pivotal movement by the vertically straight run portion of the locking bar 61.

To summarize operation of the invention for purposes of loading and unloading freight, let it first be assumed that the load platform is in the collapsed and raised position illustrated in FIG. 2. The hook 65 is first turned out of engagement with the lock pin 62 and the power means then energized to permit lowering of the runner assemblies 32. Upon the cam follower 47 coming into engagement with the curved segment 46b of the cam 46 the forward platform section 30 gradually commences unfolding and is thereafter positively constrained throughout its unfolding movement by the mutual engagement of the camming surfaces. Initially, the outer platform section 31 is gravitationally biased to vertically depending position relative to the hinge 41, until the pair of rollers 56 come into engagement with the pair of chains 33, which have been slack to this point. Thereafter, as indicated in FIG. 4, upon further unfolding movement of the forward platform section 30 the tensioned pair of chains 33 effect angular unfolding movement of the outer platform section 31 relative to the platform hinge 41. In the final increment of unfolding movement of the forward platform section 30 by the cam elements 46 and 47, the pair of rollers 56 are swung downwardly out of engagement with the now straight and fully tensioned chains 33 until the butt joint of the platform sections overlying the hinge 41 is made. Thereafter, upon continued lowering movement of the runner assemblies 32 both platform sections are in a common horizontal plane.

Upon the horizontally disposed platform sections 30 and 31 coming to ground level, the spring biased cam element 47 is biased to the vertically extending position indicated in FIG. 1, out of interfering alignment with the cam 46, whereby the unfolded load platform is in readiness for load lifting or lowering in the usual manner. In order to refold the platform, when it is raised to approximately the position shown in FIG. 9 the cam follower 47 is manually turned forwardly into alignment with the cam 46 so that upon continued upward movement of the runner assemblies 32 the platform sections are folded one upon the other in the reverse of the sequence of positions shown in FIGS. 2–5.

As will now be apparent, a variety of modifications of the invention are possible. Thus, as indicated previously, both sides of the supporting framework may be provided with cams 46 and a corresponding pair of cam elements 47 may be mounted on a common shaft for operation in unison. A spring loaded stop may be employed, if desired, to hold the cam element 47 in the erect position of FIG. 1. It will also be apparent that use of the invention is not limited to the tailgate environment of a truck but may be employed independently as a self contained unit with its own supporting framework. It will be understood that these and other modifications are possible without departing from the invention.

I claim:

1. A self-folding and unfolding platform lift comprising:
    a supporting framework;
    a vertically elongate runner assembly mounted on said framework for vertical movement;
    an inner platform section having a forward edge horizontally pivotally connected to a lower end of said runner assembly;
    an outer platform section having a forward edge connected to a rear edge of said inner platform section by a horizontal hinge means positioned for folding an underside of said outer platform section into superposition over an underside of said inner platform section;
    a finite length of a flexible member having one end connected at a rear edge of said outer platform section and another end connected to an upper end of said runner assembly;

means intermediate said inner platform section and said framework to translate vertical movement of said runner assembly into folding or unfolding movement of said inner platform section;

and means defining a rigid rearward extension of said inner platform section for contacting and seating an intermediate portion of said flexible member for effecting folding or unfolding movement of said outer platform section, relative to said hinge means, as a function of corresponding folding or unfolding movement of said inner platform section.

2. A self-folding and unfolding platform lift as in claim 1 in which said means to translate movement of said runner assembly into movement of said inner platform section is selectively actuable between operative and inoperative positions.

3. A self-folding and unfolding platform lift as in claim 1 in which said means to translate movement of said runner assembly into movement of said inner platform section comprises cam means.

4. A self-folding and unfolding platform lift as in claim 3 in which said cam means comprises a cam follower carried on said forward edge of said inner platform section and a vertically extending cam affixed to said framework.

5. A self-folding and unfolding platform lift as in claim 1 in which said inner platform section and said outer platform section have cooperating means limiting further unfolding movement of said platform sections when said platform sections have been unfolded to a common horizontal plane.

6. A self-folding and unfolding platform lift as in claim 5 in which said cooperating means comprise shape characteristics of said rear edge of said inner platform section and said forward edge of said outer platform section defining a butt joint overlying said hinge means.

7. A self-folding and unfolding platform lift as in claim 1 in which said rigid rearward extension of said inner platform section is coplanar with said inner platform section.

8. In a platform lift having a horizontal hinge interconnecting inner and outer platform sections for folding the unfolded sections out of a common horizontal load bearing plane into vertically extending superposed relationship of the undersides of the folded sections, a vertically elongate runner assembly to whose lower end the forward edge of the inner platform section is horizontally pivotally connected, the runner assembly being vertically movably mounted on a supporting framework, the improvement comprising;

a finite length of a flexible member having one end connected at the rear edge of the outer platform section and having another end connected to the upper end of the runner assembly;

means intermediate the inner platform section and the framework to translate vertical movement of the runner assembly on the framework into folding or unfolding movement of the inner platform section;

and means defining a rigid rearward extension of the inner platform section for contacting and seating an intermediate portion of said flexible member for effecting folding and unfolding movement of the outer platform section as a function of the corresponding folding or unfolding movement of the inner platform section.

9. The improvement of claim 8 in which said means to translate movement of the runner assembly into movement of the inner platform section is selectively actuable between operative and inoperative positions.

10. The improvement of claim 8 in which said means to translate movement of the runner assembly into movement of the inner platform section comprises cam means.

11. The improvement of claim 10 in which said cam means comprises a cam follower carried on the forward edge of the inner platform section and a vertically extending cam affixed to the framework.

12. The improvement of claim 8 in which said rigid rearward extension is coplanar with the inner platform section.

13. A self-folding and unfolding platform lift for the tailgate of a truck comprising:

a support framework having a laterally spaced apart pair of vertically extending guide channels;

a pair of vertically elongate runner assemblies mounted on said guide channels for vertical movement in unison;

an inner platform section having a forward edge horizontally pivotally connected to lower ends of said runner assemblies;

an outer platform section having a forward edge connected to a rear edge of said inner platform section by a horizontal hinge means positioned for folding an underside of said outer platform section into superposition over an underside of said inner platform section, said inner platform section and said outer platform section having cooperating means limiting further unfolding movement of said platform sections when said platform sections have been unfolded to a common horizontal plane;

a pair of lengths of a flexible member on opposite sides of said platform lift, each flexible member having one end connected at a rear edge of said outer platform section and having another end connected to an upper end of the corresponding one of said pair of runner assemblies;

means intermediate said inner platform section and said framework to translate vertical movement of said pair of runner assemblies into folding or unfolding movement of said inner platform section;

and a pair of means, on opposite sides of said platform lift, defining a rigid rearward extension of the corresponding side of said inner platform section and positioned in a common vertical plane with the corresponding one of said pair of flexible members for contacting and seating an intermediate portion of said flexible member for effecting folding or unfolding movement of said outer platform sections, relative to said hinge means, as a function of corresponding folding or unfolding movement of said inner platform section.

14. A self-folding and unfolding platform lift as set forth in claim 13 in which one of said runner assemblies carries a selectively engageable and disengageable latch means for holding said platform sections in vertically extending collapsed folded position against said pair of runner assemblies, one of said guide channels fixedly mounting a vertically extending bar for slidable engagement with said latch means for retaining said latch means in either of engaged or disengaged positions, the upper end portion of said retaining bar defining a clearance for effecting movement of said latch means between engaged and disengaged positions.

15. A platform lift as in claim 13 in which said means to translate movement of said runner assemblies into movement of said inner platform section is selectively actuable between operative and inoperative positions.

16. A platform lift as in claim 13 in which said means to translate movement of said runner assemblies into movement of said inner platform section comprises cam means.

17. A platform lift as in claim 16 in which said cam means comprises a cam follower carried on said forward edge of said inner platform section at one side of said platform and a vertically extending cam affixed to the corresponding one of said guide channels in vertical alignment with said cam follower.

18. A platform lift as in claim 17 in which said cam follower is pivotally connected to said inner platform section.

19. A platform lift as in claim 18 in which said cam follower is biased towards a retracted position out of vertical alignment with said cam, said cam follower being released for movement to said retracted position upon downward movement of said inner platform section and cam follower downwardly beyond the lower end of said cam.

20. A platform lift as in claim 13 in which said cooperating means limiting unfolding movement of said platform sections comprise shape characteristics of said rear edge of said inner platform section and said forward edge of said outer platform section defining a butt joint overlying said hinge means.

21. A platform lift as in claim 13 in which said rigid rearward extensions on opposite sides of said inner platform section are coplanar with said inner platform section.

* * * * *